UNITED STATES PATENT OFFICE.

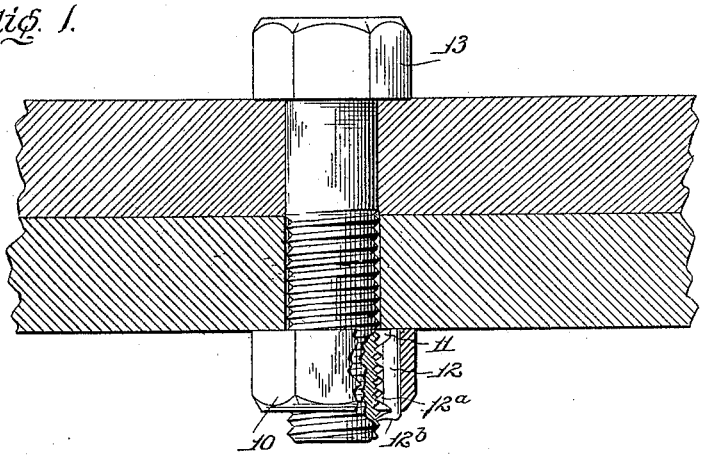
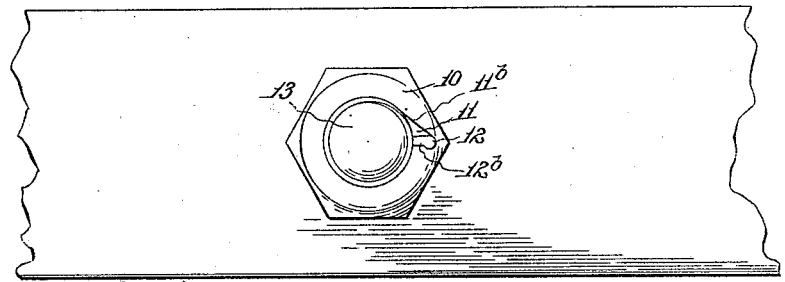
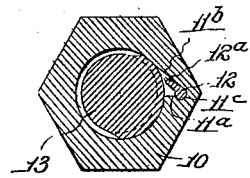 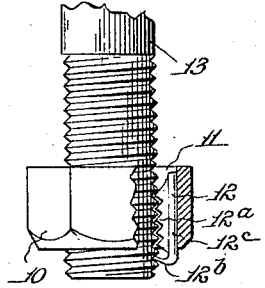 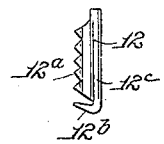
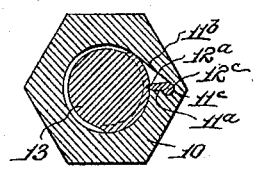
Carrington Phelps.
INVENTOR.

CARRINGTON PHELPS, OF NEW YORK, N. Y.

NUT-LOCK.

1,320,271.   Specification of Letters Patent.   Patented Oct. 28, 1919.

Application filed May 8, 1919. Serial No. 295,678.

*To all whom it may concern:*

Be it known that I, CARRINGTON PHELPS, a citizen of the United States, residing in the city, county, and State of New York, have invented Nut-Locks, of which the following is a full and complete specification.

My invention relates especially to that particular class of nut-lock devices in which the nut is provided at one side of the bolt-aperture with a key for intimately engaging the bolt to prevent either said bolt or the nut from working or turning loose.

In the present instance my invention contemplates a novel form of nut-locking device which is applied to the nut alone so that it may be used in connection with an ordinary bolt; thereby not only eliminating the expense incident to a specially formed bolt but also permitting locking engagement of the key at any point so that the nut may be tightened or adjusted to any extent desired.

My invention further contemplates application of the locking-key to the nut and its engagement with the bolt in a peculiar manner that will permit the nut to be readily adjusted on the bolt either with said locking-key inserted and carried by the nut or withdrawn during said operation of applying or adjusting the nut, the latter having a form of recess at one side of the bolt aperture to receive the key and permit it to be turned for coöperative engagement with the bolt and nut preparatory to driving the key into locked engagement with the bolt.

Other advantages of my improved nut-lock device will hereinafter appear, and what I particularly claim as my invention, and desire to protect by Letters-Patent is more specifically set forth in the appended claim.

In the drawings:

Figure 1 is a sectional view illustrating the application of my invention to a bolt and nut employed for fastening two parts together, the nut being shown partly in section.

Fig. 2 is an end view, looking at the nut, with the key in locked engagement with the bolt.

Fig. 3 is a side view of the bolt and nut, the latter being partly broken away and showing the key in position to permit the nut to be turned in either direction.

Fig. 4 is a transverse sectional view with the key in position to permit the nut to be turned.

Fig. 5 is a similar view, the key being turned to engage between the thread of the bolt.

Fig. 6 is a detail view of the locking key.

Like letters and numerals of reference indicate like parts in all the views of the drawing.

In carrying out my invention I provide the nut, 10, with a recess 11 at one side of and parallel with the bolt-aperture to open into the latter, the shape of the recess being such as to present a radial wall $11^a$ and a tangential wall $11^b$, with a longitudinal concavity $11^c$ in the radial wall at its juncture with the tangential wall, for the purpose hereinafter explained. As shown the recess extends through the nut from one side to the other, but, as will be obvious hereinafter, this is not necessary, as it is practical to terminate the recess before it reaches the inner side of the nut. However, the recess as shown in the drawings is preferred inasmuch as it can be more easily made in forming the nut and is more desirable in the operation of the locking-key, hereinafter described, which coöperates with said recess.

The locking-key, designated 12, is in the form of a flat plate of metal, preferably steel, with a series of teeth $12^a$ at one edge and a rib $12^c$ at the other edge, and as this key is adapted to be inserted in and work in the recess 11 in the nut the rib $12^c$ corresponds in cross-sectional shape with that of the concavity $11^c$ into which it fits and by which said plate is pivoted in said recess. Likewise the teeth $12^a$ correspond with the pitch of the thread in the nut so that they may enter between the corresponding thread on the bolt; that is, project into the grooves at one side of the bolt formed by the thread on said bolt. Each tooth is beveled at its lower edge so that it may bite into the thread on the bolt when the locking-key is driven farther into the nut. The locking-key is provided at its outer end with a projection or finger $12^b$, extending in the direction of the teeth and spaced with respect to the adjoining tooth so as to also enter between the thread on the bolt, said projection or finger acting to securely hold the locking-key in place.

In operation, after the nut is screwed on the bolt or adjusted thereon to the desired extent the locking-key 12 is inserted in the recess with the toothed edge following down the tangential wall $11^b$, and when the inner end of said key strikes the surface against which the nut is turned said key is drawn out a slight distance and then turned to bring its teeth and finger in engagement with the thread on the bolt, as shown in Fig. 3, after which the key is driven in by a sharp blow with a hammer, causing the teeth to bite into the thread on the bolt (see Fig. 1), thereby locking the nut and bolt together against turning backward or becoming loose. It will be noted that when the key is in locked position as shown in Fig. 1 a flat side of said key bears against the radial wall $11^a$ of the recess in the nut, as shown in Fig. 5, and as the teeth are buried in the thread of the bolt neither the bolt nor nut can be turned backward. As the locking-key is driven in the finger $12^b$ which is also in engagement with the thread on the bolt bends or gives, but being in intimate frictional engagement with the bolt and wedged between the thread thereon it provides the means for securely holding said locking-key in its locked engagement with the bolt. As will be clearly obvious this provides a very simple and effective means for locking the nut on the bolt and will positively prevent the nut from becoming loose under the influence of vibration, making it especially useful for fastening together parts of automobiles, bridge pieces, and structural work of all kinds.

To unscrew the nut the operation may be accomplished either by first screwing the nut on the bolt to a very slight extent, until the key moves out of engagement with the bolt where it may be held to the position shown in Fig. 4 during the manipulation of the nut in unscrewing the same, or, if the nut is screwed too tightly against the part it fastens to permit of this slight movement, then a sharp tool may be driven under the finger $12^b$ so as to bring the teeth $12^a$ of the locking-key out of engagement with the thread on the bolt and in alinement with the spiral groove formed by said thread, as shown in Fig. 4, when the said key may be turned into the recess in the nut and removed from the nut.

In locking the nut on the bolt the locking-key does not materially injure the thread on said bolt, and therefore when the key is disengaged for the purpose of removing the nut the bolt and nut may be readily turned one upon the other and both may be used again.

The resilient finger $12^b$ is also serviceable in retaining the locking-key temporarily in the nut by frictional engagement with the bolt; thus the bolt, nut and key may be held together when not in actual use; in this instance the said finger frictionally engaging the bolt in the groove between the thread thereon.

Having described my invention, I claim:

In a nut-lock, a nut having a longitudinal recess at one side of the bolt-aperture and extending from one side of the nut to the other, said recess presenting a radial wall, a tangential wall and a concavity at the junction of said walls, and a locking-key having teeth at one edge spaced to correspond with the thread in the nut to loosely follow in the corresponding thread on the bolt, said teeth being each beveled at opposite sides to a sharpened point, a rib at the other edge of the key fitting the concavity, and a finger at the outer end of said key projecting in the direction of the teeth and slightly longer than the latter so as to engage between the thread on the bolt and bend when the key is driven in to hold the biting engagement of said key, substantially as shown and described.

CARRINGTON PHELPS.